United States Patent

Kuwajima et al.

Patent Number: 4,463,111
Date of Patent: Jul. 31, 1984

[54] CATHODE-DEPOSITING ELECTROCOATING COMPOSITION, AND PRODUCTION THEREOF

[75] Inventors: Teruaki Kuwajima, Higashiosaka; Akira Matsumura, Hirakata, both of Japan

[73] Assignee: Nippon Paint Co., Ltd., Osaka, Japan

[21] Appl. No.: 441,852

[22] Filed: Nov. 15, 1982

[30] Foreign Application Priority Data

Nov. 16, 1981 [JP] Japan .................... 56-183966

[51] Int. Cl.³ .................................... C08L 63/08
[52] U.S. Cl. ........................ 523/413; 204/181 C; 523/414; 523/426; 524/901
[58] Field of Search ............ 523/414, 413, 410, 406; 524/901; 528/103.5; 525/328.1, 387; 204/181 C

[56] References Cited

U.S. PATENT DOCUMENTS

| | | | |
|---|---|---|---|
| 3,970,608 | 7/1976 | Furukawa et al. | 525/328.1 |
| 4,134,864 | 1/1979 | Belanger | 523/414 |
| 4,356,278 | 10/1982 | Daimer et al. | 523/414 |
| 4,376,848 | 3/1983 | Subramanyam et al. | 524/901 |

Primary Examiner—Theodore E. Pertilla
Attorney, Agent, or Firm—Wenderoth, Lind & Ponack

[57] ABSTRACT

A cathode-depositing electrocoating composition which comprises as a film-forming component a carbon-to-carbon double bond containing resin having a principal chain of acetylene-conjugated diene random copolymer and a basic group, combined to the principal chain in a ratio of from 0.02 to 0.8 mol per 100 g of said resin and capable of forming in an aqueous medium a group of the formula:

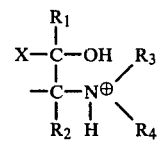

wherein $R_1$ and $R_2$, which are the same or different, are each a hydrogen atom, a halogen atom or a hydrocarbon residue having 1 to 6 carbon atoms, $R_3$ and $R_4$ which are the same or different, are each a hydrogen atom or an organic residue having 1 to 10 carbon atoms or are combined to form together with the intermediary nitrogen atom a cyclic group having 1 to 7 carbon atoms, and X is a hydrogen atom or a bond, and when X is a bond, both the carbon atoms carrying $R_1$ and $R_2$ are bonded or belong to the principal chain, said resin being dissolved or dispersed in an aqueous medium through neutralization with an acid. Such composition is excellent in low temperature curing property.

8 Claims, No Drawings

CATHODE-DEPOSITING ELECTROCOATING COMPOSITION, AND PRODUCTION THEREOF

This invention relates to a cathode-depositing electrocoating composition and production thereof. More particularly, it relates to a cathode-depositing electrocoating composition with excellent low temperature curing property and a process for producing such composition.

An electrocoating composition of the cathode-depositing type was proposed as an electropaint which is more anti-corrosive than that of anode-depositing type. One typical example is an electrocoating composition produced by reacting an epoxy resin without a carbon-to-carbon double bond such as glycidyl ether type epoxy resin synthesized from Bisphenol A and epichlorohydrin with a primary or secondary amine, neutralizing the obtained reaction product with an acid to form a water-soluble or water-dispersible salt and compounding the salt with a curing agent such as water-soluble melamine resin, water-soluble phenol resin or blocked polyisocyanate (Japanese Patent Publn. (examined) No. 23807/1974 and Japanese Patent Publn. (unexamined) No. 51924/1973). Although the electrocoating composition of this type had an advantage of producing a coating film which is much more anti-corrosive than that obtained by anode-depositing electropaint, it had disadvantages that its throwing power is not sufficient and that the produced coating film is inferior to that of the anode-depositing composition in smoothness, flexibility and adherence.

Another cathode-depositing electrocoating composition was proposed lately, which is produced by epoxidizing a high-molecular compound having a carbon-to-carbon double bond such as natural drying oil or liquid diene polymer and converting the obtained epoxy compound into a salt in a manner similar to that in the above mentioned cathode-depositing composition (Japanese Patent Publn. (unexamined) No. 16048/1978). This composition had an advantage that it can be cured, without using a specific curing agent, by oxidative reaction of the carbon-to-carbon double bond which remains unreacted after the epoxidization. However, the composition also had disadvantages that the produced coating film required high curing temperature, was liable to sag, and was insufficient in adherence, water resistance and alkali resistance.

It has now been discovered that a cathode-depositing electrocoating composition which is curable at low temperature and has excellent physical properties can be obtained by using an acetylene-conjugated diene random copolymer as the principal chain of the film-forming resin.

Said cathode-depositing electrocoating composition comprises, as a film-forming component, a carbon-to-carbon double bond containing resin having a principal chain of acetylene-conjugated diene random copolymer and a basic group, combined to the principal chain in a ratio of from 0.02 to 0.8 mol per 100 g of said resin and capable of forming in aqueous medium a group of the formula:

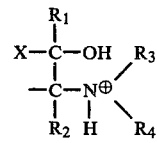

wherein $R_1$ and $R_2$, which are the same or different, are each a hydrogen atom, a halogen atom or a hydrocarbon residue having 1 to 6 carbon atoms, $R_3$ and $R_4$, which are the same or different, are each a hydrogen atom or an organic residue having 1 to 10 carbon atoms or are combined to form together with the intermediary nitrogen atom a cyclic group having 1 to 7 carbon atoms, and X is a hydrogen atom or a bond, and when X is a bond, both the carbon atoms carrying $R_1$ and $R_2$ are bonded or belong to the principal chain, said resin being dissolved or dispersed in an aqueous medium through neutralization with an acid.

The cathode-depositing electrocoating composition according to the invention can be produced by reacting the epoxidization product of an acetylene-conjugated diene random copolymer with a primary or secondary monoamine to give a carbon-to-carbon double bond containing resin having a principal chain of said copolymer and a basic group, combined to the principal chain in a ratio of from 0.02 to 0.8 mol per 100 g of said resin and capable of forming in an aqueous medium a group of the formula:

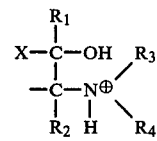

wherein $R_1$, $R_2$, $R_3$, $R_4$ and X are each as defined above, and dissolving or dispersing said resin in an aqueous medium through neutralization with an acid.

A suitable acetylene-conjugated diene random copolymer is one which has uniform or controlled composition. Such copolymer may include those developed by the applicant (Japanese Patent Publns. (unexamined) Nos. 106/1982, 107/1982, 108/1982 and 109/1982). Copolymers disclosed in older applications (Japanese Patent Publns. (examined) Nos. 48665/1974 and 14272/1975) are not convenient because of their varied composition.

The acetylene-conjugated diene random copolymer can be produced by copolymerizing acetylene with a conjugated diene in a manner, for example, described later in Reference Examples 1 and 2. The conjugated diene may include a compound of the formula: $CH_2=C(R')-C(R'')=CH_2$ wherein $R'$ and $R''$, which are the same or different, are each a hydrogen atom, a halogen atom or a hydrocarbon residue having 1 to 6 carbon atoms (e.g. butadiene, isoprene, chloroprene, 2,3-dimethylbutadiene). The content of acetylene in the copolymer with the conjugated diene is not critical but is normally 1 to 60%. A deficiency of acetylene brings a slowing down of the curing rate, while an excess yields a too rapid curing which makes it difficult to handle the copolymer in the air.

It is considered that the excellent low temperature curing property of the electrocoating composition according to the invention results from the high reactivity of the copolymer based upon the diallyl repeating unit —CH=CH—CH$_2$—CH=CH—, which is assumed to be more active than the monoallyl repeating unit —CH=CH—CH$_2$—CH$_2$—CH=CH— in polymerization.

The epoxidization product of the acetylene-conjugated diene random copolymer has a group of the formula:

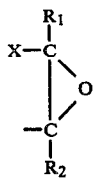
(II)

wherein R$_1$, R$_2$ and X are each as defined above, and is produced by epoxidizing the acetylene-conjugated diene random copolymer in the conventional manner. When the uniformly composed copolymer is subjected to the epoxidization with hydrogen peroxide or a peroxyacid, an epoxidized product free from partial gel can be obtained, while the copolymer with varied composition brings the formation of gel.

The epoxidization product necessarily contains the epoxy group in a ratio of from 0.02 to 0.8 mol per 100 g of said product. A deficiency of the epoxy group deteriorates the solubility or the dispersibility of the resin in the aqueous medium, while an excess results in a too soluble resin which gives a less water-resistant coating film.

The epoxidization product is then reacted with a primary or secondary monoamine of the formula NH(R$_3$)(R$_4$) wherein R$_3$ and R$_4$ are each as defined above. Said monoamine may include mono- or dialkylamine, for example, where the alkyl group contains 1 to 4 carbon atoms (e.g. propylamine, butylamine, diethylamine, dipropylamine, etc.), mono- or dialkanolamine, for example, where the hydroxyalkyl group contains 1 to 4 carbon atoms (e.g. ethanolamine, propanolamine, diethanolamine, dipropanolamine, etc.), alicyclic monoamine (e.g. cyclohexylamine, etc.) and heterocyclic monoamine (e.g. pyrrolidine, morpholine, etc.).

It is preferable to use the monoamine in an amount equimolar to the epoxy group in the epoxidized compound. However, an excess amount may be used and unreacted amine may be removed after reaction. Also, a deficient amount may be used so that a part of the epoxy groups remain unreacted.

The reaction between the epoxidized product and the monoamine can be carried out in the conventional manner, i.e. at a temperature of normally 50° to 200° C., preferably of 100° to 180° C., and in the presence or absence of solvent. It is preferable to use solvents (e.g. benzene, toluene, xylene, cyclohexane, methyl cellosolve, ethyl cellosolve, propyl cellosolve, butyl cellosolve, ethyl ether, glyme, diglyme, etc.) when the epoxidized product is thick, but it is not preferable when the epoxidized product is mobil. Especially preferable solvents are water-miscible ones (e.g. methyl cellosolve, ethyl cellosolve, butyl cellosolve, glyme, diglyme, etc.) because they need not be removed before the dissolving or dispersing step.

The carbon-to-carbon double bond containing resin obtained in the reaction of the epoxidized product and monoamine is then dissolved or dispersed in an aqueous medium by means of the conventional neutralization. The neutralization may be effected with an inorganic acid (e.g. hydrochloric acid, sulfuric acid, etc.) or an organic acid (e.g. formic acid, acetic acid, propionic acid, lactic acid, etc.), which may be used in 0.2 to 1 mol equivalent per group (I) in the resin. The aqueous medium may contain various solvents (e.g. ethyl cellosolve, propyl cellosolve, butyl cellosolve, ethyleneglycol dimethyl ether, diethyleneglycol dimethyl ether, diacetonealcohol, 4-methyl-4-methyl-2-pentanone, etc.) which are water-miscible and have an affinity to the resin, in order to improve the solubility or dispersibility of the resin, stability and fluidity of the composition or smoothness of the coated film.

In the electrocoating composition according to the invention, the quantitative ratio of said resin as the film-forming component to other components is not critical. However, in general, the composition may contain 0–100 parts by weight of solvent, 0–300 parts by weight of pigment and 10–2000 parts by weight of water. In addition, the electrocoating composition may contain the conventional curing agents such as water-soluble or dispersible melamine resin, water-soluble or dispersible phenol resin and blocked polyisocyanate. Suitable melamine resin may include a reaction product of urea, benzoguanamine or melamine with an aldehyde, and its etherized derivative. Suitable phenol resin may include a reaction product of a phenolic compound with an aldehyde which may be either a prepolymer or polymer so far as it has a reactive methylol group. The amount of the melamine resin or phenol resin is not critical but normally is in the range of 5–40% by weight, preferably 8–30% by weight per the total solid binder.

In case the curing agent is the blocked polyisocyanate (which has one or more blocked isocyanate groups and one or less free isocyanate group per molecule on average), it is preferable to react with the resin before the acid-neutralization, because stability of the bath liquid and curing property of the film obtained in this case are superior to those with the other curing agents. Further, the composition may contain an age-resister and stabilizer, if necessary.

The electrocoating composition according to the invention has an advantage that it is excellent in low temperature curing property due to multitude of radically active sites owing to the fact that the principal chain is the acetylene-conjugated diene random copolymer. Further, it has such advantages that the formed coating film is beautiful and smooth due to the uniformity of the resin composition, the film has no sagging and pinhole, is superior in adherence, water resistance and alkali resistance and has a hard surface and good flexibility owing to the 1,4-unsaturated structure of the resin. On the other hand, the composition does not have the disadvantage of giving inhomogeneous bath liquid, owing to its self-curing property. Also, the composition does not have the disadvantage of giving contaminated color, unstable bath liquid and insufficient corrosion resistance, owing to the fact that it is a cathode-depositing type.

The composition according to the invention is also useful as a water-based paint for spraying or dipping.

The invention will now be further illustrated by means of the following Reference Examples and Examples, which are not, however, intended to limit the scope of the invention.

REFERENCE EXAMPLE 1

Into a 5 liter cylindrical glass reactor, the atmosphere of which was replaced with nitrogen, were charged nickel naphthenate (30 mmol) and dried toluene (2 kg). After measuring the humidity in the reactor, deoxygenated deionized water was added until total amount of water in the reactor became exactly 150 mmol. Diethyl aluminium chloride (210 mmol, as a 4 mol/l hexane solution) was added with stirring at 20° C., and mixed gas of acetylene and butadiene (in a 1:10 molar ratio) was introduced immediately. The reactor was kept at 30° C. for 6 hours. Then, deionized water (100 ml) was added in order to discontinue the reaction. The residual catalyst and solvent were removed in the conventional manner to give pale yellow acetylene-butadiene random copolymer (1020 g).

Geometric configuration of the carbon-to-carbon double bond in the copolymer was measured according to Morero's method. It was found that the copolymer contained 88% of cis-type, 6% of trans-type and 6% of vinyl-type double bond. The copolymer had 9.1 mol% of acetylene content and its degree of randomness was determined by NMR measurement.

REFERENCE EXAMPLE 2

Reference Example 1 was substantially repeated except that the gas ratio of acetylene to butadiene was 3:10 and the reaction period was 12 hours. There was obtained brownish yellow acetylene-butadiene random copolymer.

Geometric configuration of the carbon-to-carbon double bond was measured and it was found that the copolymer contained 82% of cis-type, 13% of trans-type and 5% of vinyl-type double bond. Acetylene content of the copolymer was 23 mol%. Degree of randomness was determined by NMR measurement.

EXAMPLE 1

The copolymer (200 g) obtained in Reference Example 1 was charged into a 1 liter four-necked flask and diluted with toluene (200 g). Formic acid (90%, 17.0 g) was additionally charged and, after warming the mixture to 50° C., aqueous sulfuric acid (50%, 2.6 g) was added. Hydrogen peroxide (30%, 210 g) was added dropwise through a dropping funnel with stirring at 50°-60° C. over 1 hour. The reaction was continued with stirring at 50° C. for 5 hours. The reaction mixture was washed with water until the pH of the washings exceeded 5. Then, the mixture was concentrated under reduced pressure in order to remove volatile substances such as toluene and water to give pale yellow, clear epoxidized copolymer, which had an epoxy equivalent of 0.36 mol/100 g.

The epoxidized copolymer (200 g) and N-methylethanolamine (36 g) were charged into a 500 ml separating flask and heated at 150° C. for 20 minutes. Unreacted amine was removed from the mixture under reduced pressure to give a resin as a film-forming component, which had an amine equivalent of 0.13 mol/100 g.

Acetic acid was added to the resin at a neutralization rate of 88% and the neutralized mixture was dissolved in pure water to give a resin solution containing 15% by weight of solid component.

The resin solution was charged into a 1 liter stainless steel container, which was used as anode, and cathode-depositing type electrocoating was carried out under the conditions shown in Table 1.

The obtained coatings on plates were heat-hardened at 130°, 140°, 150° and 160° C. for 30 minutes, respectively, and tested for hardness. The results are shown in Table 2.

EXAMPLE 2

The copolymer obtained in Reference Example 2 was epoxidized in a manner similar to that in Example 1. The epoxy equivalent was 0.36 mol/100 g. The epoxidized copolymer was ring-opened with N-methylethanolamine to give a resin for film-forming. The amine equivalent was 0.13 mol/100 g.

Acetic acid was added to the above resin at a neutralization rate of 85% and the neutralized resin was dissolved in pure water to give a resin solution containing 15% by weight of solid component.

The resin solution was used for electrocoating in a manner similar to that in Example 1. The results are shown in Tables 1 and 2.

EXAMPLE 3

The epoxidized copolymer obtained in Example 1 was reacted with dibutylamine in a manner similar to that in Example 1 to give a resin for film-forming. The amine equivalent was 0.14 mol/100 g.

The resin was neutralized with acetic acid to a degree of 88% and dissolved in pure water to give a resin solution containing 15% by weight of solid component.

The resin solution was used for electrocoating in a manner similar to that in Example 1. The results are shown in Tables 1 and 2.

EXAMPLE 4

Epoxidization in Example 1 was substantially repeated except that the reaction period was 2 hours to give an epoxidized copolymer having an epoxy equivalent of 0.14 mol/100 g. The epoxidized copolymer was treated in the same manner as that in Example 1 to give a resin solution, which was used for electrocoating. The results are shown in Tables 1 and 2.

COMPARATIVE EXAMPLE

Commercial cis-1,4-polybutadiene ("Polyoil #110" manufactured by Hüls Inc.) was epoxidized in a manner similar to that in Example 1 to give an epoxidized polybutadiene having an epoxy equivalent of 0.35 mol/100 g. The epoxidized polybutadiene was ring-opened with N-methylethanolamine to give a resin having an amine equivalent of 0.20 mol/100 g. The resin was neutralized with acetic acid to a degree of 30% and dissolved in a concentration of 15% by weight in water. The solution was used for electrocoating in the same manner as that in Example 1. The results are shown in Tables 1 and 2.

TABLE 1

| Example | Coating voltage (V) | Coating period (min) | Residual current (mA) | Electric conductivity ($\mu v$/cm) | pH |
|---|---|---|---|---|---|
| 1 | 100 | 3 | 40 | 1040 | 5.36 |
| 2 | 100 | 3 | 60 | 980 | 5.42 |
| 3 | 100 | 3 | 50 | 1100 | 5.32 |
| 4 | 100 | 3 | 40 | 1020 | 5.38 |
| Comparative | 100 | 3 | 90 | 920 | 5.56 |

TABLE 2

| Example | Hardening temperature (°C.) | MIBK* rubbing | Pencil hardness | Film appearance |
| --- | --- | --- | --- | --- |
| 1 | 130 | >50 | H | Good |
|  | 140 |  | 2H |  |
|  | 150 |  | 3H |  |
|  | 160 |  | 6H |  |
| 2 | 130 | >50 | 2H | Good |
|  | 140 |  | 4H |  |
|  | 150 |  | 5H |  |
|  | 160 |  | 6H |  |
| 3 | 130 | >50 | H | Good |
|  | 140 |  | 2H |  |
|  | 150 |  | 3H |  |
|  | 160 |  | 6H |  |
| 4 | 130 | >50 | H | Good |
|  | 140 |  | 2H |  |
|  | 150 |  | 3H |  |
|  | 160 |  | 4H |  |
| Comparative | 130 | 8 | <6B | Sagged |
|  | 140 | 15 | <6B |  |
|  | 150 | 25 | 6B |  |
|  | 160 | 50 | 4B |  |

Note:
*MIBK: methylisobutylketone

What is claimed is:

1. A cathode-depositing electrocoating composition which comprises as a film-forming component a carbon-to-carbon double bond containing resin having a principal chain of acetylene-conjugated diene random copolymer and a basic group, combined to the principal chain in a ratio of from 0.02 to 0.8 mol per 100 g of said resin and capable of forming in an aqueous medium a group of the formula:

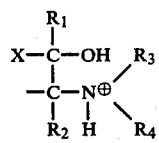

wherein $R_1$ and $R_2$, which are the same or different, are each a hydrogen atom, a halogen atom or a hydrocarbon residue having 1 to 6 carbon atoms, $R_3$ and $R_4$, which are the same or different, are each a hydrogen atom or an organic residue having 1 to 10 carbon atoms, or $R_3$ and $R_4$ are combined to form, together with the intermediary nitrogen atom, a cyclic group having 1 to 7 carbon atoms, and X is a hydrogen atom or a bond, and when X is a bond, both the carbon atoms carrying $R_1$ and $R_2$ are bonded or belong to the principal chain, said resin being dissolved or dispersed in an aqueous medium by neutralization with an acid.

2. The electrocoating composition as claimed in claim 1 in which the conjugated diene is butadiene.

3. The electrocoating composition as claimed in claim 1 in which $R_3$ and $R_4$ are alkyl or hydroxyalkyl having 1 to 4 carbon atoms.

4. The electrocoating composition as claimed in claim 1 in which $R_3$ is a methyl group and $R_4$ is a hydroxyethyl group.

5. The electrocoating composition as claimed in claim 1 in which $R_3$ and $R_4$ are each a butyl group.

6. The electrocoating composition as claimed in claim 1 in which the acid is acetic acid.

7. A process for producing a cathode-depositing electrocoating composition which comprises reacting an epoxidization product of an acetylene-conjugated diene random copolymer with a primary or secondary monoamine to give a carbon-to-carbon double bond containing resin having a principal chain of said copolymer and a basic group, combined to the principal chain in a ratio of from 0.02 to 0.8 mol per 100 g of said resin and capable of forming in an aqueous medium a group of the formula:

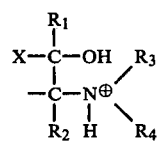

wherein $R_1$ and $R_2$, which are the same or different, are each a hydrogen atom, a halogen atom or a hydrocarbon residue having 1 to 6 carbon atoms, $R_3$ and $R_4$, which are the same or different, are each a hydrogen atom or an organic residue having 1 to 10 carbon atoms, or $R_3$ and $R_4$ are combined to form, together with the intermediary nitrogen atom, a cyclic group having 1 to 7 carbon atoms, and X is a hydrogen atom or a bond, and when X is a bond, both the carbon atoms carrying $R_1$ and $R_2$ are bonded or belong to the principal chain, and dissolving or dispersing said resin in an aqueous medium by neutralization with an acid.

8. The process as claimed in claim 7 in which the amount of the monoamine is equimolar to the epoxy groups in the epoxidization product.

* * * * *